US012257946B1

(12) United States Patent
Currey

(10) Patent No.: US 12,257,946 B1
(45) Date of Patent: Mar. 25, 2025

(54) AUXILIARY LIGHT MOUNTING ASSEMBLY

(71) Applicant: Benjamin Casey Currey, New River, AZ (US)

(72) Inventor: Benjamin Casey Currey, New River, AZ (US)

( * ) Notice: Subject to any disclaimer, the term of this patent is extended or adjusted under 35 U.S.C. 154(b) by 0 days.

(21) Appl. No.: 18/611,864

(22) Filed: Mar. 21, 2024

(51) Int. Cl.
*B60Q 1/04* (2006.01)

(52) U.S. Cl.
CPC ........... *B60Q 1/0441* (2013.01); *B60Q 1/045* (2013.01)

(58) Field of Classification Search
CPC .................................... F21S 8/02; F21S 8/026
See application file for complete search history.

(56) References Cited

U.S. PATENT DOCUMENTS

| 5,548,499 A * | 8/1996 | Zadeh | F21V 21/30 |
| | | | 362/147 |
| 8,297,469 B1 * | 10/2012 | Alford | A61J 1/16 |
| | | | 220/592.2 |
| 11,293,634 B2 * | 4/2022 | Brown | A47G 23/0266 |
| 2004/0231174 A1 * | 11/2004 | Janssen | B43L 7/00 |
| | | | 33/413 |

FOREIGN PATENT DOCUMENTS

DE    102017130023 A1 *  6/2019

OTHER PUBLICATIONS

English translation of Fuersich DE-102017130023-A1 (Year: 2019).*

* cited by examiner

*Primary Examiner* — Evan P Dzierzynski

(74) *Attorney, Agent, or Firm* — Schmeiser, Olsen & Watts LLP

(57) ABSTRACT

An auxiliary light mounting assembly for a light device is provided. A cylindrical mounting member receives the light device within a front end. A mounting strap secures the mounting assembly to a tubular structure. Spherical recesses are provided on a rear end of the cylindrical mounting member in order to accommodate the tubular structure. The mounting assembly protects the light device from debris.

20 Claims, 13 Drawing Sheets

AUXILIARY LIGHT MOUNTING ASSEMBLY

BACKGROUND OF THE INVENTION

Technical Field

This invention relates generally to an auxiliary light mounting assembly and more particularly to an auxiliary light mounting assembly for a coupling a light device to a tubular structure.

State of the Art

Vehicles often have lights mounted to a tubular structure or to a tubular frame member. The lights are generally bolted and/or screwed to keep the lights secure. The bolts and screws are often permanently drilled into the frame causing permanent damage. Magnet mounts are also sometimes used but may become easily dislodged from the frame of the vehicle in rough terrain. Additionally, there are other tubular structures that lights can be mounted to that are not vehicle related.

Accordingly, an easy to install, secure mounting assembly to mount lights to a tubular structure is needed.

SUMMARY OF THE INVENTION

An embodiment includes an auxiliary light mounting assembly for a light device comprising: a cylindrical mounting member receiving the light device therein; a mounting strap device secured to a cylindrical side wall portion of the cylindrical mounting member; a rearward edge portion provided on a rear end of the cylindrical mounting member; and a forward edge portion provided on a front end of the cylindrical mounting member, wherein the mounting strap device extends between diametrically opposed portions on the rear end adjacent to the rearward edge portion of the cylindrical mounting member.

The mounting strap device may comprise a strap member. An adjustable threaded fastener may be provided within a cylindrically shaped housing to receive the strap member therein. A plurality of rectangular shaped apertures may be provided within an engagement end portion of the strap member and the engagement end portion may be received within the cylindrically shaped housing. A protective cover member may be provided on the strap member. A plurality of U-shaped recesses may be provided about the forward edge portion of the front end of the cylindrical mounting member.

A pair of diametrically opposed spherical recesses may be provided on the rearward edge portion of the rear end of the cylindrical mounting member. A pair of first U-shaped recessed portions may be respectively provided in a lower portion of each of the pair of diametrically opposed spherical recesses. A circular plate member may be provided to secure the light device to the cylindrical mounting member. A pair of diametrically opposed tab members may be provided to extend from a circular peripheral edge portion of the circular plate member. The pair of diametrically opposed tab members may be received within the pair of first U-shaped recessed portions and are secured thereto.

A wiring harness may extend from the light device and may be accommodated within one of the pair of first U-shaped recessed portions. A pair of second U-shaped recessed portions may be respectively provided on the rearward edge portion of the rear end of the cylindrical mounting member. The pair of second U-shaped recessed portions may be positionally offset about 90 degrees from the pair of first U-shaped recessed portions.

A pair of rectangular shaped apertures may be respectively provided adjacent and inwardly spaced from the pair of second U-shaped recessed portions within the cylindrical side wall portion of the cylindrical mounting member. The mounting strap device may be accommodated within both the pair of second U-shaped recessed portions and the pair of rectangular shaped apertures.

A centrally located circular aperture may be provided through a central portion of the circular plate member. A centrally positioned threaded bolt member may extend through an axial bore provided in the light device and may be received within the centrally located circular aperture and a threaded nut and planar washer may be provided on the centrally positioned threaded bolt member. A centrally positioned threaded bolt member may extend through an axial bore provided in the light device and is received within the centrally located circular aperture and an internally threaded cylindrical member may be provided on a rear surface of the circular plate member to threadingly receive the centrally positioned threaded bolt member.

Another embodiment includes a method of mounting an auxiliary light mounting assembly for a light device to a tubular structure, the method comprising: providing a cylindrical mounting member to receive the light device therein; securing a mounting strap device to a cylindrical side wall portion of the cylindrical mounting member; providing a rearward edge portion on a rear end of the cylindrical mounting member; providing a forward edge portion on a front end of the cylindrical mounting member; extending the mounting strap device between diametrically opposed portions on the rear end adjacent to the rearward edge portion of the cylindrical mounting member; and attaching the cylindrical mounting member via the mounting strap device to a tubular structure.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
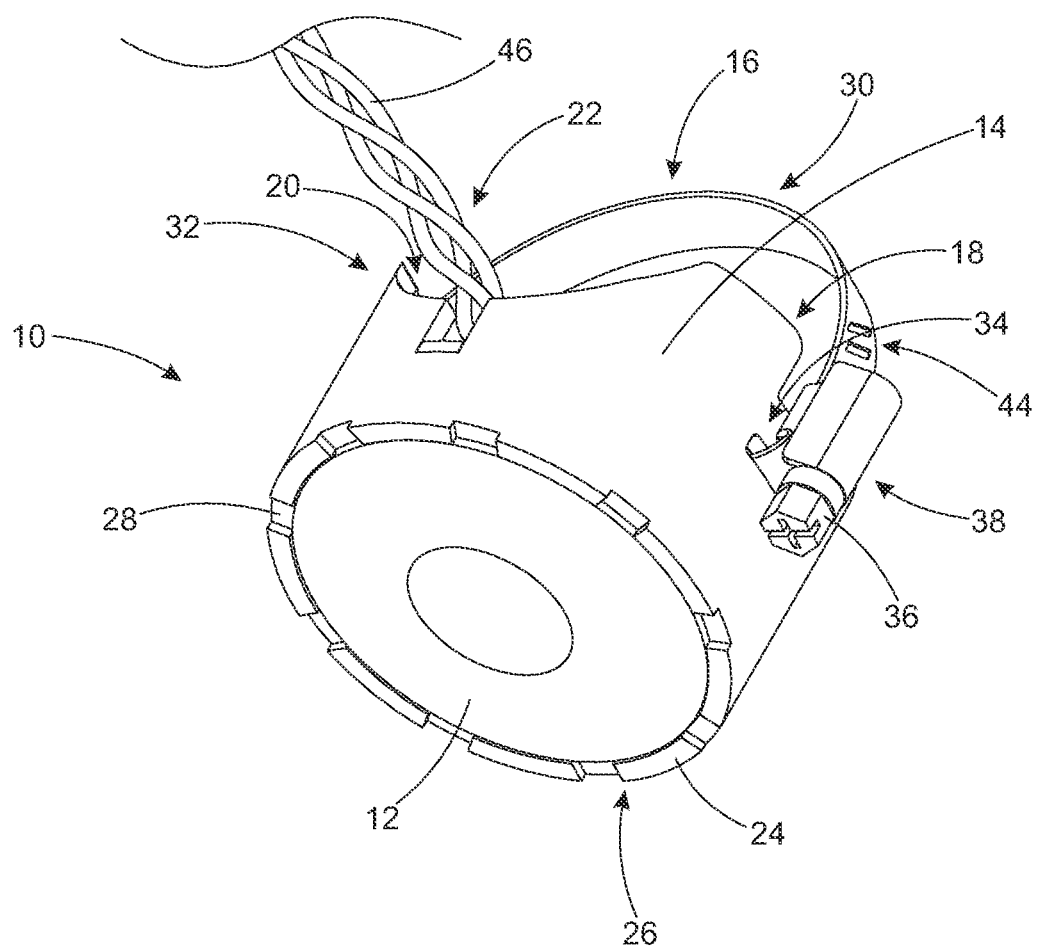
FIG. 1 is a frontal perspective view of an auxiliary light mounting assembly having a light device according to an embodiment.
Figure 2:
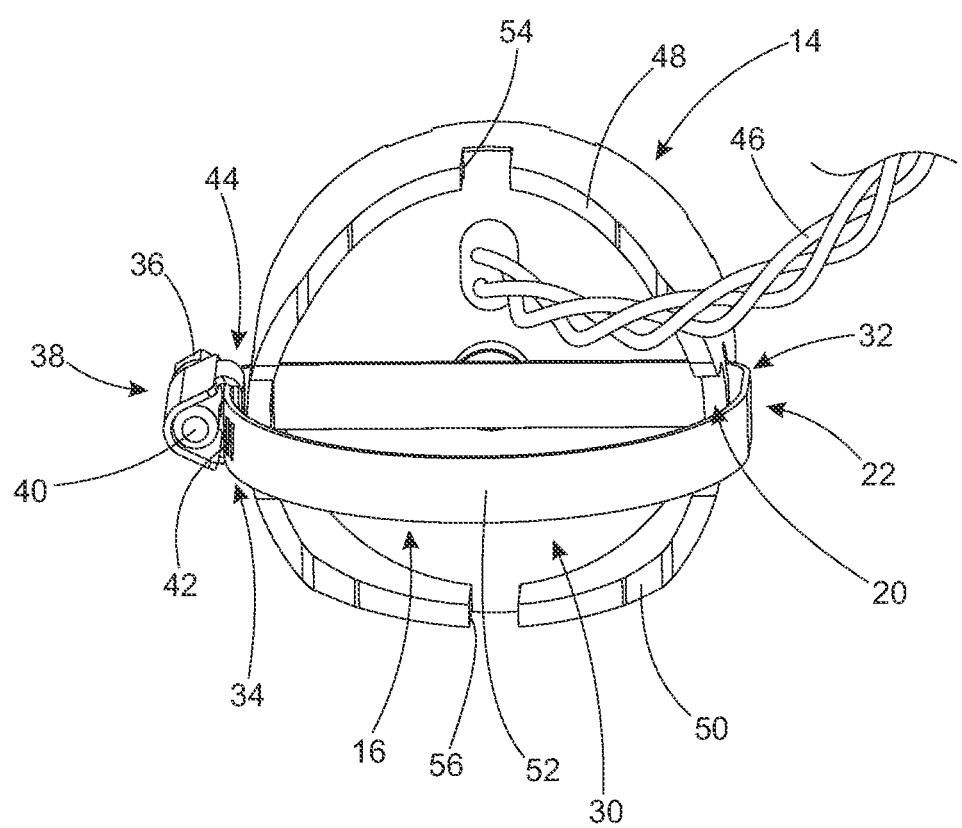
FIG. 2 is a rearward perspective view of an auxiliary light mounting assembly according to an embodiment.

As discussed above, embodiments of the present invention relate to an auxiliary light mounting assembly. The mounting assembly further protects the light from debris. The light may be any type of light, such as LED lights, including KC Cyclone® lights. The mounting assembly secures to a tubular structure. The mounting assembly is easily removable without permanent damage to the tubular structure.

In FIGS. 1-7, an auxiliary light mounting assembly 10 is provided for a light device 12 received within a cylindrical mounting member 14. A wiring harness 46 is provided to extend from a rear portion (not shown) of the light device 12. The cylindrical mounting member 14 is provided with a mounting strap device 16 secured to a cylindrical side wall portion 18. The mounting strap 16 is generally secured adjacent a rearward edge portion 20 which is provided on a rear end 22 of the cylindrical mounting member 14. A forward edge portion 24 is provided on a front end 26 of the cylindrical mounting member 14. A plurality of U-shaped recesses 28 are provided about the forward edge portion 24 of the front end 26 of the cylindrical mounting member 14.

The mounting strap device 16 is provided with a strap member 30 to extend between diametrically opposed portions 32 and 34. The diametrically opposed portions 32 and 34 are provided on the rear end 22 adjacent the rearward edge portion 20 of the cylindrical mounting member 14.

In some embodiments, an adjustable threaded fastener 36 may be provided within a cylindrically shaped housing 38 to threadingly receive the adjustable threaded fastener 36 in order to adjust the strap member 30 therein. Threads 40 (FIGS. 2-4) are provided on the adjustable threaded fastener 36 and engage a plurality of rectangular shaped apertures 42. The plurality of rectangular shaped apertures 42 is provided within an engagement end portion 44 of the strap member 30. The engagement end portion 44 is received within the cylindrically shaped housing 38 in order to be actuated by rotation of the adjustable threaded fastener 36.

A pair of diametrically opposed semi-spherical recesses 48 and 50 are provided on the rearward edge portion 20 of the rear end 22 of the cylindrical mounting member 14. The pair of diametrically opposed semi-spherical recesses 48 and 50 are positioned on a tubular structure (not shown) and secured thereto via the tightening of the strap member 30, such as in some embodiments, through rotation of the adjustable threaded fastener 36. A protective cover member 52 may be provided on the strap member 30 in order to prevent damage to the tubular structure (not shown).

A pair of first U-shaped recessed portions 54 and 56 are respectively provided in a lower portion of each of the pair of diametrically opposed spherical recesses 48 and 50. One of the pair of first U-shaped recessed portions 54 and 56 may accommodate the wiring harness 46 therein. A pair of second U-shaped recessed portions 58 and 60 are respectively provided on the rearward edge portion 20 of the rear end 22 of the cylindrical mounting member 14. The pair of second U-shaped recessed portions 58 and 60 are positionally offset about 90 degrees from the pair of first U-shaped portions 54 and 56.

A pair of rectangular shaped apertures 62 and 64 are respectively provided adjacent and inwardly spaced from the pair of second U-shaped recessed portions 58 and 60 within the cylindrical side wall portion 18 of the cylindrical mounting member 14. The mounting strap device 16 is accommodated within both the second U-shaped recessed portions 58 and 60 and the pair of rectangular shaped apertures 62 and 64 in order to secure the auxiliary light mounting assembly 10 to a tubular structure (not shown).

The strap member 30 of the mounting strap device 16 extends from the cylindrically shaped housing 38 provided on one of the diametrically opposed portions 32 and 34. The strap member 30 extends through the pair of apertures 62 and 64. The strap member 30 continues over the rearward edge portion 20 of the rear end 22 from the other of the diametrically opposed portions 32 and 34. The engagement end portion 44 of the strap member 30 having the plurality of apertures 42 is received within the cylindrically shaped housing 38. The strap member 30 is adjusted, such as, but not limited to, by rotation of the adjustable threaded fastener 36. The strap member 30 is tightened about a tubular structure (not shown) in order to secure the cylindrical mounting member 14 and light device 12 to the tubular structure (not shown).

Figure 3:
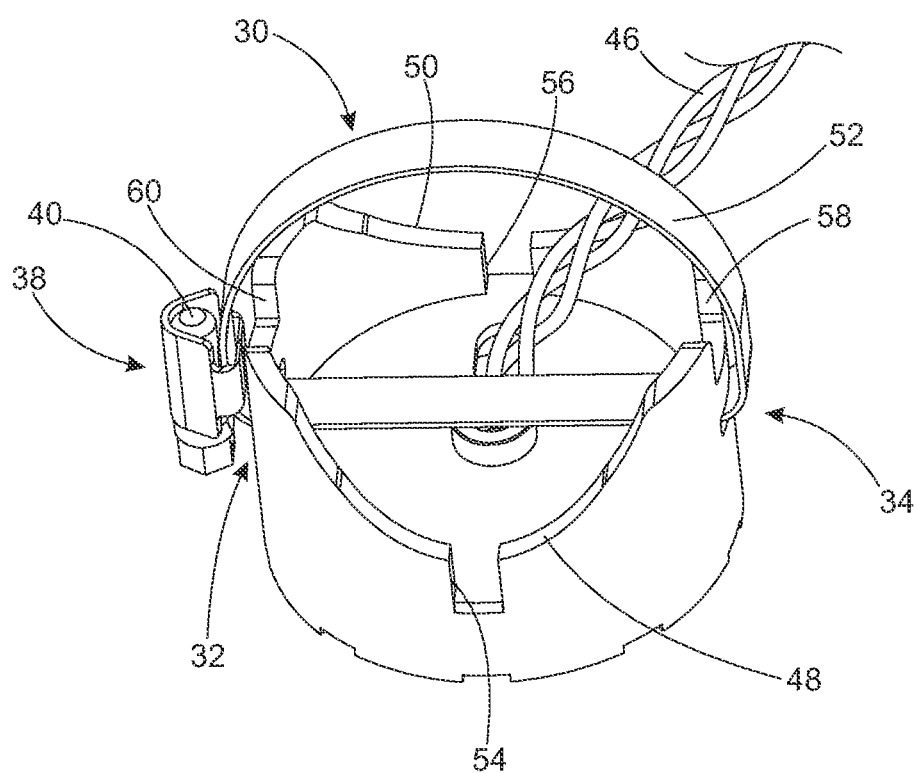
FIG. 3 is a rearward perspective view of an auxiliary light mounting assembly according to an embodiment.
Figure 4:
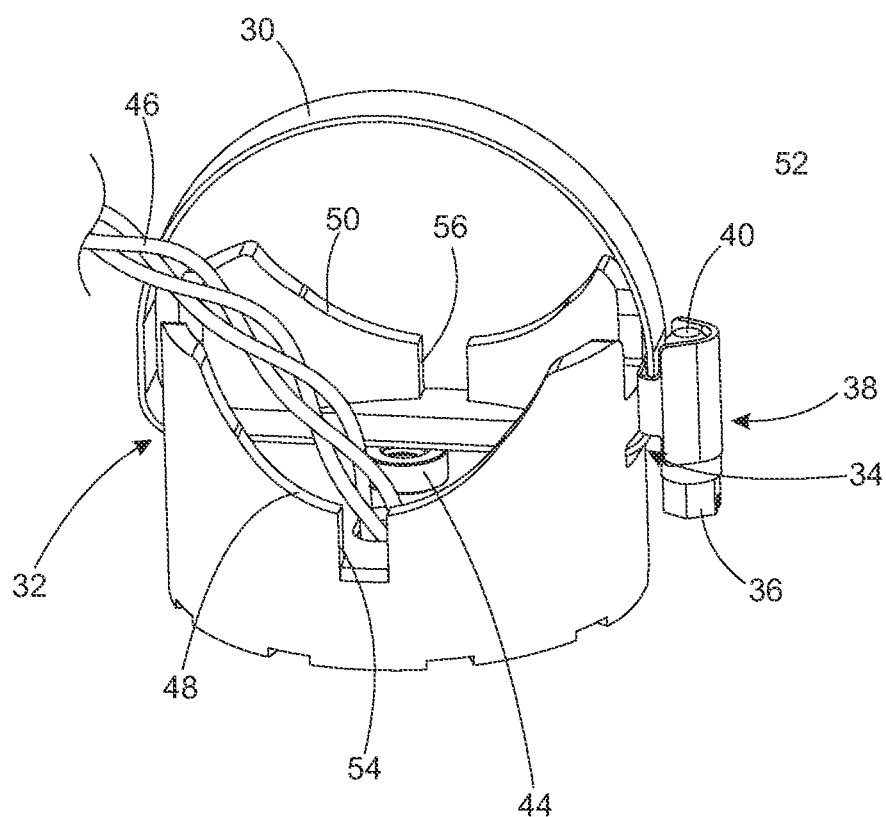
FIG. 4 is a side perspective view of an auxiliary light mounting assembly according to an embodiment.
Figure 5:
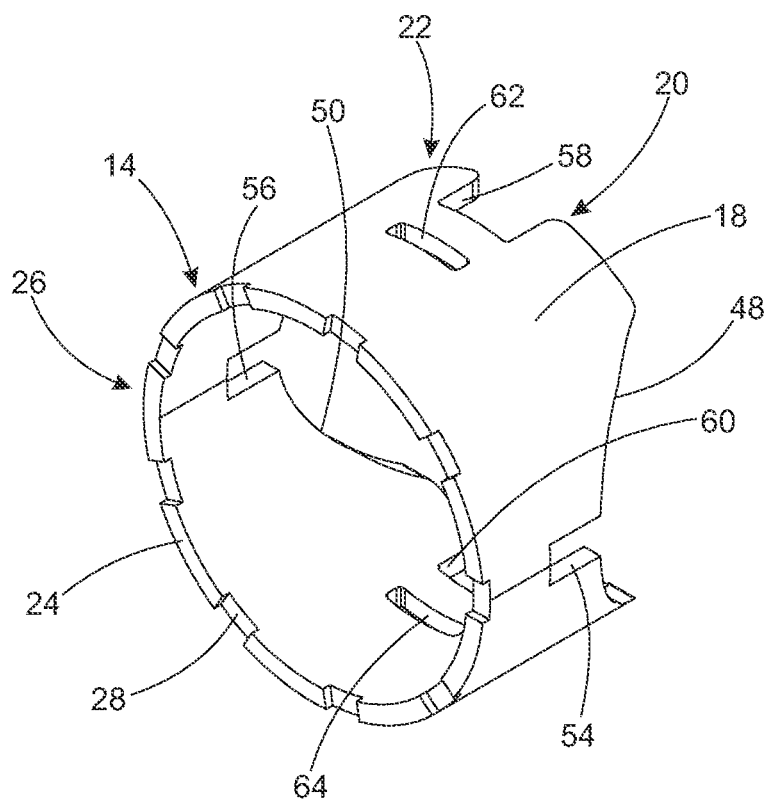
FIG. 5 is a perspective view of a cylindrical mounting member of an auxiliary light mounting assembly according to an embodiment.
Figure 6:
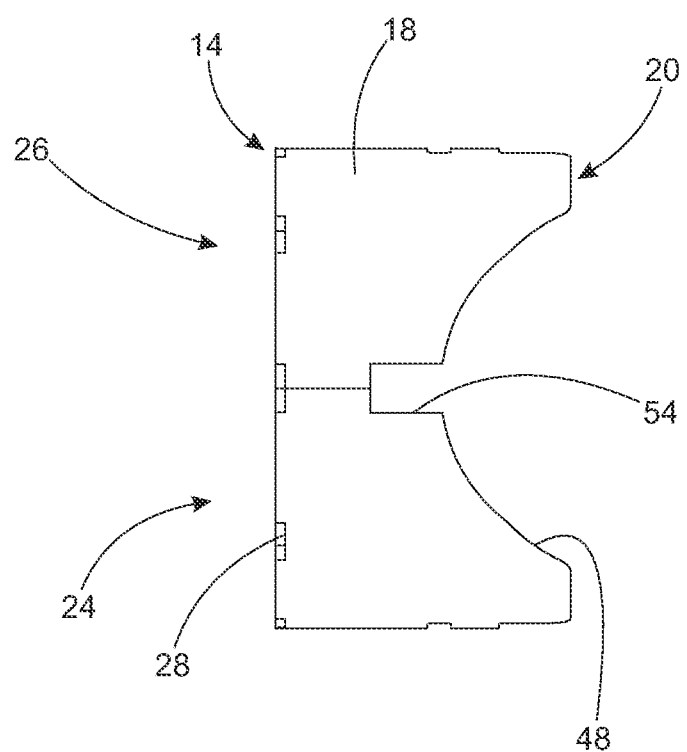
FIG. 6 is a side plan view of a cylindrical mounting member of an auxiliary light mounting assembly according to an embodiment.
Figure 7:
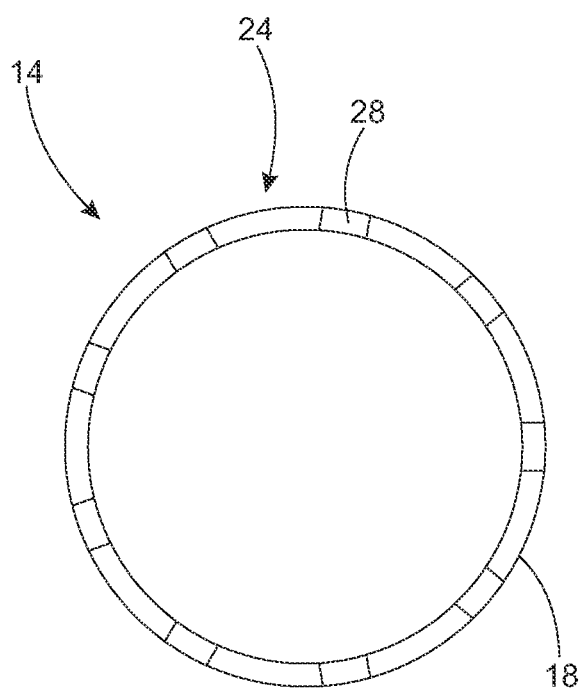
FIG. 7 is a frontal plan view of a cylindrical mounting member of an auxiliary light mounting assembly according to an embodiment.
Figure 8:
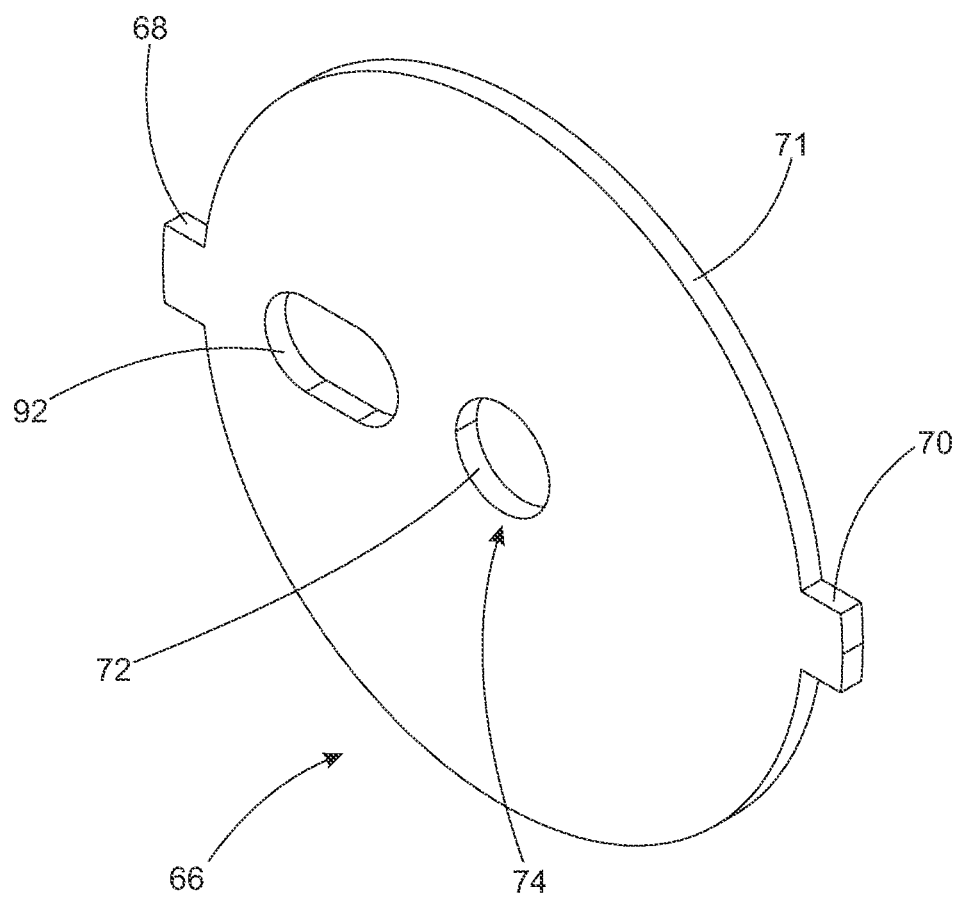
FIG. 8 is a perspective view of a circular plate member of an auxiliary light mounting assembly according to an embodiment.
Figure 9:
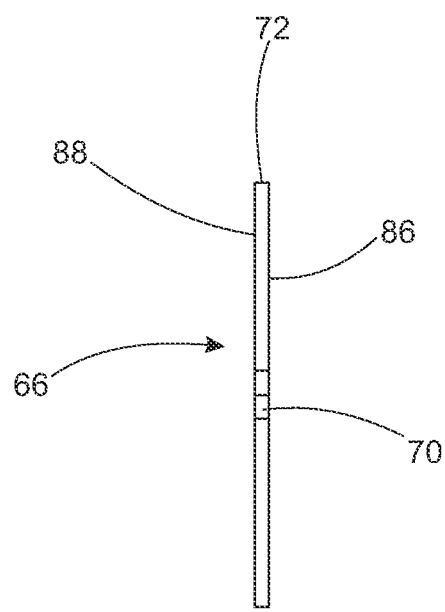
FIG. 9 is a side plan view of a circular plate member of an auxiliary light mounting assembly according to an embodiment.
Figure 10:
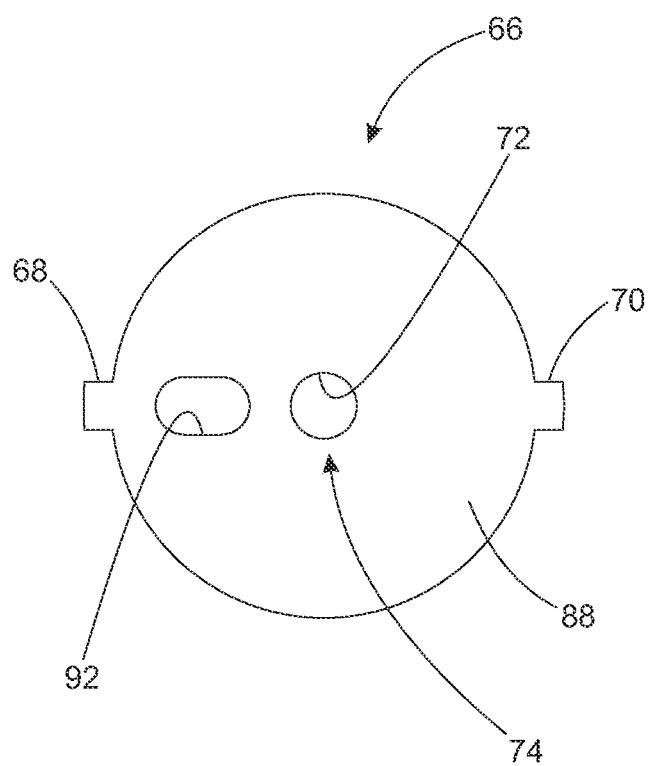
FIG. 10 is a frontal plan view of a circular plate member of an auxiliary light mounting assembly according to an embodiment.
Figure 11:
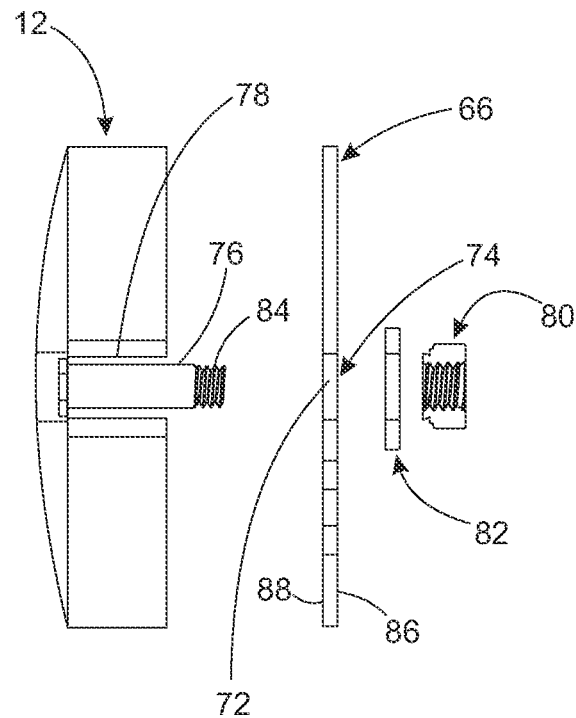
FIG. 11 is an exploded side view of an auxiliary light mounting assembly according to an embodiment.

In FIGS. 8-13, a circular plate member 66 is provided to secure the light device 12 to the cylindrical mounting member 14. A pair of diametrically opposed tab members 68 and 70 are provided to extend from a circular peripheral edge portion 71 of the circular plate member 66. The pair of diametrically opposed tab members 68 and 70 are received within the pair of first U-shaped recessed portions 54 and 56 and are secured thereto (FIGS. 3 and 4).

A centrally located circular aperture 72 is provided through a central portion 74 of the circular plate member 66. The centrally located circular aperture 72 accommodates a centrally positioned bolt member 76 extending through an axial bore 78 provided in the light device 12. The centrally positioned threaded bolt member 76 is fixedly secured to the circular plate member 66 with a threaded nut 80 and a planar washer 82. The threaded nut 80 and planar washer 82 are provided on a threaded end portion 84 of the centrally positioned threaded bolt member 76.

The circular plate member 66 is provided with a rear surface 86 and a front surface 88. The threaded nut 80 is threaded onto the threaded end portion 84 and is threaded along the centrally positioned threaded bolt member 76. The threaded nut 80 secures the planar washer 82 against the rear surface 86 of the circular plate member 66 thereby fixedly securing the light device 12 to the circular plate member 66.

Figure 12:
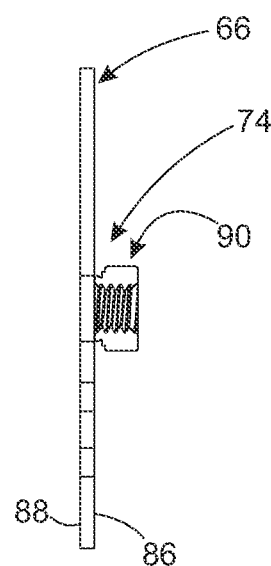
FIG. 12 is a side plan view of a circular plate member of an auxiliary light mounting assembly according to an embodiment.
Figure 13:
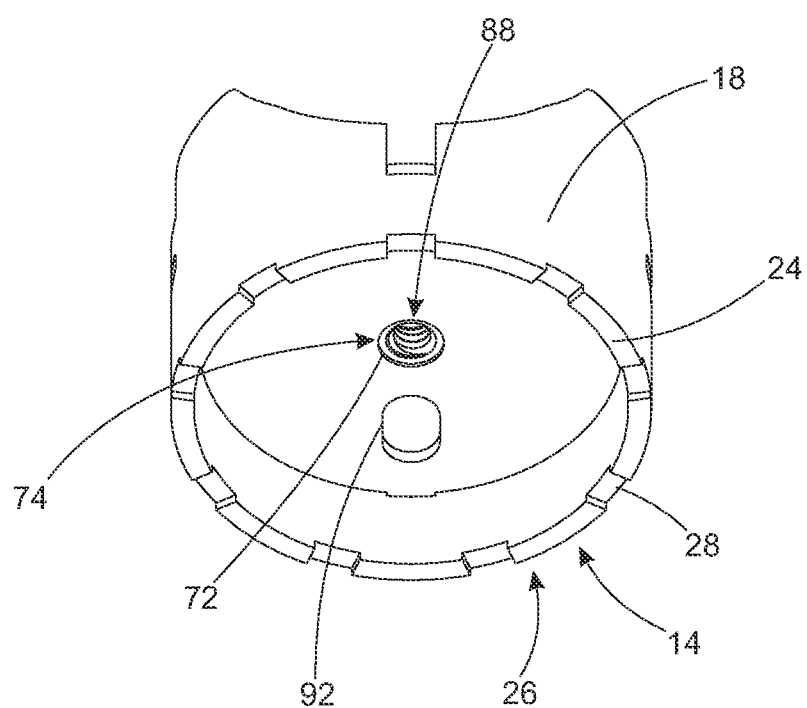
FIG. 13 is a frontal perspective view of a circular plate member within a cylindrical mounting member of an auxiliary light mounting assembly according to an embodiment.

In FIGS. 12 and 13, an alternative embodiment is shown. An internally threaded cylindrical member 90 is provided on the rear surface 86 of the circular plate member 66 and secures to the centrally positioned threaded bolt member 76. The internally threaded cylindrical member 90 is fixedly secured to the rear surface 86 of the circular plate member 66. The internally threaded cylindrical member 90 threadingly receives the centrally positioned threaded bolt member 76 thereby fixedly securing the light device 12 to the circular plate member 66.

An elongate aperture 92 is provided within the circular plate member 66. The elongate aperture 92 is positioned between the centrally located circular aperture 72 and one of the pair of diametrically opposed tab members 68 and 70. The elongate aperture 92 is provided with an elongate rubber grommet member 94 in order to accommodate the wiring harness 46 therethrough (FIGS. 3 and 4).

Figure 14:
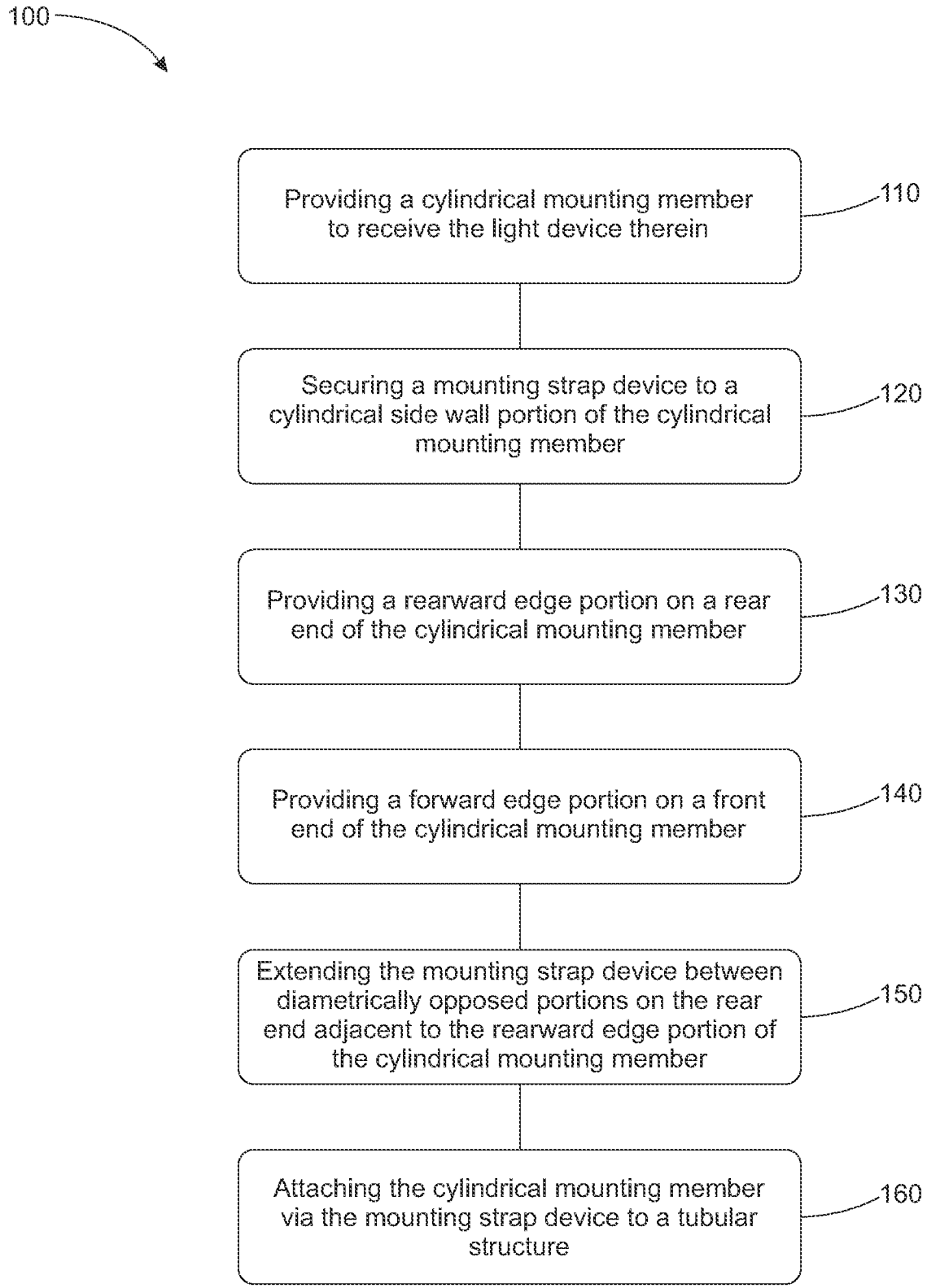
FIG. 14 is a flow chart depicting a method of mounting an auxiliary light mounting assembly on a tubular structure according to an embodiment.

Referring to the drawings, FIG. 14 depicts a method 100 of mounting an auxiliary light mounting assembly to a tubular structure. The method 100 comprises: providing a cylindrical mounting member to receive the light device therein [110]; securing a mounting strap device to a cylindrical side wall portion of the cylindrical mounting member [120]; providing a rearward edge portion on a rear end of the cylindrical mounting member [130]; providing a forward edge portion on a front end of the cylindrical mounting member [140]; extending the mounting strap device between diametrically opposed portions on the rear end adjacent to the rearward edge portion of the cylindrical mounting member [150]; and attaching the cylindrical mounting member via the mounting strap device to a tubular structure [160].

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An auxiliary light mounting assembly for a light device comprising:
 a cylindrical mounting member receiving the light device therein;
 a mounting strap device secured to a cylindrical side wall portion of the cylindrical mounting member;
 a rearward edge portion provided on a rear end of the cylindrical mounting member; and
 a forward edge portion provided on a front end of the cylindrical mounting member, wherein the mounting strap device extends between diametrically opposed portions on the rear end adjacent to the rearward edge portion of the cylindrical mounting member.

2. The auxiliary light mounting assembly of claim 1, wherein the mounting strap device comprises a strap member.

3. The auxiliary light mounting assembly of claim 2, wherein an adjustable threaded fastener is provided within a cylindrically shaped housing to receive the strap member therein.

4. The auxiliary light mounting assembly of claim 3, wherein a plurality of apertures is provided within an engagement end portion of the strap member and wherein the engagement end portion is received within the cylindrically shaped housing.

5. The auxiliary light mounting assembly of claim 4, wherein a protective cover member is provided on the strap member.

6. The auxiliary light mounting assembly of claim 1, wherein a plurality of U-shaped recesses are provided about the forward edge portion of the front end of the cylindrical mounting member.

7. The auxiliary light mounting assembly of claim 1, wherein a pair of diametrically opposed semi-spherical recesses are provided on the rearward edge portion of the rear end of the cylindrical mounting member.

8. The auxiliary light mounting assembly of claim 7, wherein a pair of first U-shaped recessed portions are respectively provided in a lower portion of each of the pair of diametrically opposed spherical recesses.

9. The auxiliary light mounting assembly of claim 8, wherein a circular plate member is provided to secure the light device to the cylindrical mounting member.

10. The auxiliary light mounting assembly of claim 9, wherein a pair of diametrically opposed tab members are provided to extend from a circular peripheral edge portion of the circular plate member.

11. The auxiliary light mounting assembly of claim 10, wherein the pair of diametrically opposed tab members are received within the pair of first U-shaped recessed portions and are secured thereto.

12. The auxiliary light mounting assembly of claim 11, wherein a wiring harness extends from the light device and is accommodated within one of the pair of first U-shaped recessed portions.

13. The auxiliary light mounting assembly of claim 12, wherein a pair of second U-shaped recessed portions are respectively provided on the rearward edge portion of the rear end of the cylindrical mounting member.

14. The auxiliary light mounting assembly of claim 13, wherein the pair of second U-shaped recessed portions are positionally offset about 90 degrees from the pair of first U-shaped recessed portions.

15. The auxiliary light mounting assembly of claim 14, wherein a pair of rectangular shaped apertures are respectively provided adjacent and inwardly spaced from the pair of second U-shaped recessed portions within the cylindrical side wall portion of the cylindrical mounting member.

16. The auxiliary light mounting assembly of claim 15, wherein the mounting strap device is accommodated within both the pair of second U-shaped recessed portions and the pair of rectangular shaped apertures.

17. The auxiliary light mounting assembly of claim 16, wherein a centrally located circular aperture is provided through a central portion of the circular plate member.

18. The auxiliary light mounting assembly of claim 17, wherein a centrally positioned threaded bolt member extends through an axial bore provided in the light device and is received within the centrally located circular aperture and wherein a threaded nut and planar washer are provided on the centrally positioned threaded bolt member.

19. The auxiliary light mounting assembly of claim 17, wherein a centrally positioned threaded bolt member extends through an axial bore provided in the light device and is received within the centrally located circular aperture and wherein an internally threaded cylindrical member is provided on a rear surface of the circular plate member to threadingly receive the centrally positioned threaded bolt member.

20. A method of mounting an auxiliary light mounting assembly for a light device to a tubular structure, the method comprising:

providing a cylindrical mounting member to receive the light device therein;

securing a mounting strap device to a cylindrical side wall portion of the cylindrical mounting member;

providing a rearward edge portion on a rear end of the cylindrical mounting member;

providing a forward edge portion on a front end of the cylindrical mounting member;

extending the mounting strap device between diametrically opposed portions on the rear end adjacent to the rearward edge portion of the cylindrical mounting member; and attaching the cylindrical mounting member via the mounting strap device to a tubular structure.

\* \* \* \* \*